(12) United States Patent
Lee et al.

(10) Patent No.: US 8,385,739 B2
(45) Date of Patent: Feb. 26, 2013

(54) ENCODING OF WAVELENGTH CONVERTER SYSTEMS

(75) Inventors: Young Lee, Plano, TX (US); Greg Bernstein, Fremont, CA (US); Jianrui Han, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 449 days.

(21) Appl. No.: 12/711,386

(22) Filed: Feb. 24, 2010

(65) Prior Publication Data

US 2010/0220999 A1 Sep. 2, 2010

Related U.S. Application Data

(60) Provisional application No. 61/156,308, filed on Feb. 27, 2009.

(51) Int. Cl.
*H04B 10/00* (2006.01)
(52) U.S. Cl. ............................................. 398/49; 398/50
(58) Field of Classification Search ............... 398/45–57
See application file for complete search history.

(56) References Cited

U.S. PATENT DOCUMENTS

| | | | | |
|---|---|---|---|---|
| 7,633,938 B2* | 12/2009 | Kinoshita et al. | ............. | 370/389 |
| 8,081,881 B2* | 12/2011 | Oki et al. | ..................... | 398/175 |
| 8,213,793 B2* | 7/2012 | Allen | ............................. | 398/48 |
| 2002/0109879 A1* | 8/2002 | Wing So | ........................ | 359/118 |
| 2003/0147645 A1* | 8/2003 | Imajuku et al. | ................... | 398/7 |
| 2005/0259571 A1* | 11/2005 | Battou | .......................... | 370/217 |
| 2008/0170856 A1* | 7/2008 | Shi et al. | ........................ | 398/50 |
| 2009/0087184 A1* | 4/2009 | Gao et al. | ........................ | 398/79 |

OTHER PUBLICATIONS

Bradner, S., "Key Words for Use in RFCs to Indicate Requirement Levels," BCP 14, RFC 2119, Mar. 1997, 3 pages.
McCloghrie, K. and F. Kastenholz, "The Interfaces Group MIB," RFC 2863, Jun. 2000, 69 pages.
Berger, L., "Generalized Multi-Protocol Label Switching (GMPLS) Signaling Functional Description," RFC 3471, Jan. 2003, 31 pages.
"Series G: Transmissions Systems and Media, Digital Systems and Networks, Transmission Media Characteristics—Characteristics of Optical Components and Subsystems, Spectral Grids for WDM Applications: DWDM Frequency Grid," ITU-T G.694.1, Jun. 2002, 11 pages.
Bernstein, G., et al., "Routing and Wavelength Assignment Information Encoding for Wavelength Switched Optical Networks," draft-ietf-ccamp-rwa-wson-encode-02.txt; Jul. 10, 2009, 35 pages.
Otani,T., Ed., "Generalized Labels for G.694 Lambda-Switching Capable Label Switching Routers," draft-ietf-ccamp-gmpls-g-694-lambda-labels-03.txt, Jan. 13, 2009, 16 pages.

(Continued)

*Primary Examiner* — Agustin Bello
(74) *Attorney, Agent, or Firm* — Conley Rose, P.C.; Grant Rodolph; Brandt Howell (57) ABSTRACT

An apparatus comprising a path computation element (PCE) configured to perform a path computation using a wavelength converter (WC) pool information based on a dynamic WC pool model, wherein the dynamic WC pool model comprises information regarding WC pool usage state represented using a WC pool usage state vector, and wherein the information regarding WC pool usage state is communicated to the PCE using a WC usage state Type-Length-Value (TLV) that indicates an available WC in a WC pool, a used WC in the WC pool, or both. Also disclosed is a network component comprising at least one processor configured to implement a method comprising receiving a WC usage state TLV comprising information regarding WC pool usage state, establishing a WC pool usage state vector using the information in the WC usage state TLV, and calculating a WC pool connectivity matrix based on the WC usage state vector.

18 Claims, 9 Drawing Sheets

OTHER PUBLICATIONS

Bernstein, G., et al., "Routing and Wavelength Assignment Information Encoding for Wavelength Switched Optical Networks," draft-ietf-ccamp-rwa-wson-encode-00.txt; Dec. 18, 2008, 42 pages.

"Series G: Transmission Systems and Media, Digital Systems and Networks, Transmission Media Characteristics—Characteristics of Optical Components and Subsystems, Spectral Grids for WDM Applications: CWDM Wavelength Grid," ITU-T G.694.2, Dec. 2003, 10 pages.

Kompella, K., Ed., et al., "IS-IS Extensions in Support of Generalized Multi-Protocol Label Switching (GMPLS)", RFC 5307, Oct. 2008, 13 pages.

Bernstein, G., Ed., et al., "Framework for GMPLS and PCE Control of Wavelength Switched Optical Networks (WSON)," draft-ietf-ccamp-wavelength-switched-framework-01.txt, Oct. 31, 2008, 74 pages.

Bernstein, G., et al., "Routing and Wavelength Assignment Information Model for Wavelength Switched Optical Networks," draft-ietf-ccamp-rwa-info-01.txt, Nov. 3, 2008, 34 pages.

Farrel, A., "Reduced Backus-Naur Form (RBNF) A Syntax Used in Various Protocol Specifications," draft-farrel-rtg-common-bnf-07.txt, Nov. 1, 2008, 13 pages.

Katz, D., et al., "Traffic Engineering (TE) Extensions to OSPF Version 2," RFC 3630, Sep. 2003, 14 pages.

Kompella, K., Ed., et al., "Routing Extensions in Support of Generalized Multi-Protocol Label Switching (GMPLS)," RFC 4202, Oct. 2005, 25 pages.

Kompella, K., Ed., et al., "OSPF Extensions in Support of Generalized Multi-Protocol Label Switching (GMPLS)," RFC 4203, Oct. 2005, 10 pages.

Li, T., et al., "IS-IS Extensions for Traffic Engineering," RFC 5305, Oct. 2008, 18 pages.

Lee, Y., et al., "Framework for GMPLS and PCE Control of Wavelength Switched Optical Networks (WSON)," draft-ietf-ccamp-rwa-wson-framework-02.txt, Mar. 4, 2009, 96 pages.

Bernstein, G., et al., "Shared Backup Mesh Protection in PCE-Based WSON Networks," iPOP 2008, http://www.grotto-networking.com/wson/iPOP2008_WSON-shared-mesh-poster.pdf, Jun. 5-6, 2008, 2 pages.

Bernstein, G., et al., "Modeling WDM Wavelength Switching Systems for use in Automated Path Computation," http://www.grotto-networking.com/wson/ModelingWSONswitchesV2a.pdf, Jun. 2008, 7 pages.

"Series G: Transmission Systems and Media, Digital Systems and Networks, Optical System Design and Engineering Considerations," ITU-T G-series Recommendations—Supplement 39, Dec. 2008.

Bernstein, G., et al., "Modeling WDM Wavelength Switching Systems for Use in GMPLS and Automated Path Computation," Journal of Optical Communications and Networking, vol. 1, No. 1, Jun. 2009, pp. 187-195.

Lee, Y., et al., "Routing and Wavelength Assignment Information Model for Wavelength Switched Optical Networks," draft-ietf-ccamp-rwa-info-06.txt, Feb. 2, 2010, 23 pages.

G. Bernstein, et al., "Routing and Wavelength Assignment Information Encoding for Wavelength Switched Optical Networks," draft-ietf-ccamp-rwa-wson-encode-04.txt; Feb. 18, 2010, 34 pages.

"Series G: Transmission Systems and Media, Digital Systems and Networks, Digital Terminal Equipments—General; Series Y: Global Information Infrastructure, Internet Protocol Aspects and Next-Generation Networks, Internet Protocol Aspects—Transport; Network Node Interface for the Synchronous Digital Hierarchy (SDH)," ITU-T G.707/Y.1322, Jan. 2007, 196 pages.

"Series G: Transmission Systems and Media, Digital Systems and Networks, Digital Terminal Equipments—General; Series Y: Global Information Infrastructure, Internet Protocol Aspects and Next-Generation Networks, Internet Protocol Aspects—Transport; Interfaces for the Optical Transport Network (OTN)," Itu-T G.709/Y.1331, Mar. 2003, 118 pages.

"Series G: Transmission Systems and Media, Digital Systems and Networks, Digital Sections and Digital Line System—Optical Fibre Submarine Cable Systems, Forward Error Correction for High Bit-Rate DWDM Submarine Systems," ITU-T G.975.1, Feb. 2004, 58 pages.

Papadimitriou, D., Ed., "Generalized Multi-Protocol Label Switching (GMPLS) Signaling Extensions for G.709 Optical Transport Networks Control," RFC 4328, Jan. 2006, 23 pages.

Otani, T., et al., "Generalized Labels for Lambda-Switching Capable Label Switching Routers", draft-ietf-ccamp-gmpls-g-694-lambda-labels-05.txt, Dec. 7, 2009, 14 pages.

Bernstein, G., et al., "General Network Element Constraint Encoding for GMPLS Controlled Networks," draft-ietf-ccamp-general-constraint-encode-01.txt, Mar. 2, 2010, 28 pages.

Kompella, K., Ed., et al., "Intermediate System to Intermediate System (IS-IS) Extensions in Support of Generalized Multi-Protocol Label Switching (GMPLS)," RFC 4205, Oct. 2005, 10 pages.

McCloghrie, K., Ed., et al., "Structure of Management Information Version 2 (SMIv2)," RFC 2578, Apr. 1999, 43 pages.

* cited by examiner

ENCODING OF WAVELENGTH CONVERTER SYSTEMS

CROSS-REFERENCE TO RELATED APPLICATIONS

The present application claims priority to U.S. Provisional Patent Application Ser. No. 61/156,308 filed Feb. 27, 2009 by Jianrui Han et al. and entitled "Encoding of Wavelength Converter System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bi-directional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks. One of the challenges in implementing WSONs is the determination of the routing and wavelength assignment (RWA) for the various signals that are being transported through the network at any given time. To implement RWA, various NE related information can be forwarded from a Path Computation Client (PCC), such as a NE, and received and processed at a Path Computation Element (PCE). Such RWA information may include information for WSON wavelength converters.

SUMMARY

In one embodiment, the disclosure includes an apparatus comprising a PCE configured to perform a path computation using a wavelength converter (WC) pool information based on a dynamic WC pool model, wherein the dynamic WC pool model comprises information regarding WC pool usage state represented using a WC pool usage state vector, and wherein the information regarding WC pool usage state is communicated to the PCE using a WC usage state Type-Length-Value (TLV) that indicates an available WC in a WC pool, a used WC in the WC pool, or both.

In another embodiment, the disclosure includes a network component comprising at least one processor configured to implement a method comprising receiving a WC usage state TLV comprising information regarding WC pool usage state, establishing a WC pool usage state vector using the information in the WC usage state TLV, and calculating a WC pool connectivity matrix based on the WC usage state vector.

In yet another embodiment, the disclosure includes a method comprising calculating a WC pool usage state vector using a WC usage state bitmap that indicates a usage state for a plurality of WCs in a WC pool, and calculating a WC pool connectivity matrix using the WC usage state vector, a WC pool ingress connection matrix, and a WC pool egress connection matrix.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any quantity of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a WSON, some NEs may comprise a plurality of WCs, which may be grouped in a pool of shared system resources. Accordingly, some of the RWA information used for path computation may comprise information regarding the NEs associated with a WC pool, such as information regarding the accessibility and/or availability of the WCs (e.g. between ingress and egress ports in the NEs). The RWA information may also comprise limitations on the types of signals that may be converted and/or the types of wavelength conversions that may be performed.

Disclosed herein is a system and method for modeling WC pools in the WSON NEs. The WC pool modeling may be used for static and dynamic WCs, which may have fixed or changing wavelength conversion capabilities. The changing wavelength conversion capabilities may be based on the accessibility and/or availability of WCs between ingress and egress ports in the NEs. The WC pool model may comprise information regarding the usage state of individual WCs in a WC pool (e.g. for a NE), the connectivity of NE ingress and egress ports with the WCs, the wavelength constraints on the ingress and egress ports, or combinations thereof. The WC pool model may be represented using a WC pool connectivity matrix, which may be equal to the product of a WC pool ingress connection matrix, a WC pool ingress wavelength constraints matrix, a WC pool usage state vector, a WC pool egress wavelength constraints matrix, and a WC pool egress connection matrix. The WC pool model may be established using WC pool information, which may be communicated using a WC set field, a WC accessibility TLV, a WC range TLV, a WC usage state TLV, or combinations thereof.

Figure 1:
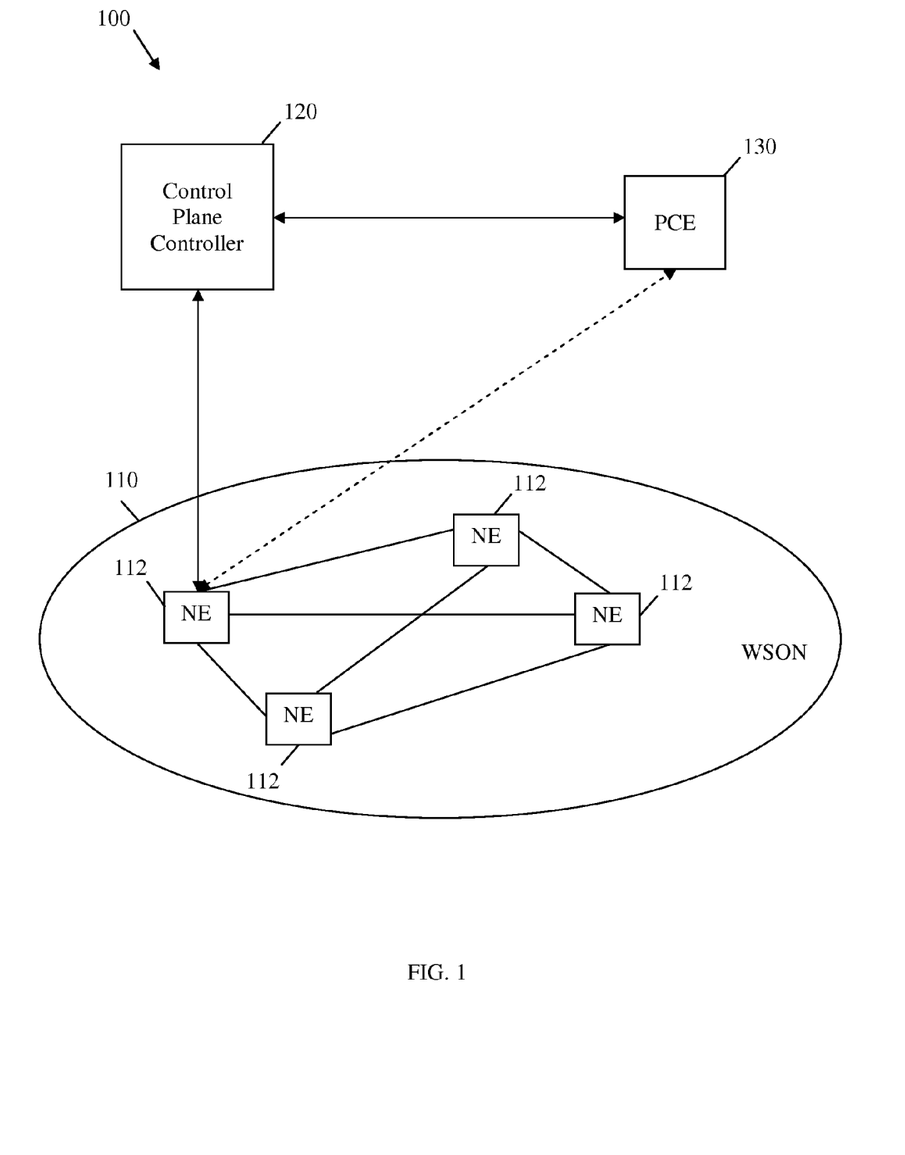
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may be any optical network that uses active or passive components to transport optical signals. For instance, the WSON 110 may be part of a long haul network, a metropolitan network, or a residential access network. The WSON 110 may implement WDM to transport the optical signals through the WSON 110, and may comprise various optical components including a plurality of NEs 112, which may be coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any quantity of NEs 112.

The NEs 112, also referred to as nodes, may be any devices or components that transport signals through the WSON 110. In an embodiment, the NEs 112 may consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with WCs, optical-electrical (OE) converters, electrical-optical (EO) converters, OEO converters, or combinations thereof. However, it may be advantageous for at least some of the NEs 112 to lack such converters as such may reduce the cost and complexity of the WSON 110. In specific embodiments, the NEs 112 may comprise optical switches such as optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

Some NEs 112 may be used for wavelength-based switching by forwarding, adding, or dropping any or all of the wavelengths that are used to transmit the optical signals. For instance, the NE 112 may comprise a plurality of ingress ports, such as line side ingress ports or add ports, a plurality of egress ports, such as line side egress ports or drop ports, or combinations thereof. The add ports and drop ports may also be called tributary ports. The optical signals handled by these various ports may comprise one or a plurality of optical wavelengths. The line side ingress ports may receive the optical signals and send some or all of the optical signals to the line side egress ports, which may in turn transmit the optical signals. Alternatively, the line side ingress ports may redirect some or all of the optical signals to the drop ports, which may drop the optical signals, for example, by transmitting the optical signals outside the optical fibers. The add port may receive additional optical signals and send the optical signals to some of the line side egress ports, which may in turn transmit the optical signals.

In some instances, the NE 112 may comprise at least one colored port that may be an ingress port or an egress port, which may receive or transmit, respectively, the optical signal at a fixed optical wavelength or a limited range of optical wavelengths. Additionally or alternatively, the NE may comprise at least one colorless port that may be an ingress port or an egress port, which may receive or transmit, respectively, the optical signal at any one of a plurality of different wavelengths. The NE 112 that comprises a colorless port and supports any or a plurality of variable wavelengths may be referred to as a colorless NE. Alternatively, the NE 112 that does not comprise a colorless port and supports one or a plurality of predetermined (or specified) wavelengths may be referred to as a colored NE. Further, the NE 112 may comprise one or a plurality of WCs that may convert one or a plurality of wavelengths between at least one ingress port and one egress port. For instance, a WC may be positioned between an ingress port and an egress port and may be configured to convert a first wavelength received at the ingress port into a second wavelength, which may then be transmitted at the egress port. The WC may comprise any quantity of optical and/or electrical components that may be configured for wavelength conversion, such as an OEO and/or a laser.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in International Telecommunication Union (ITU) Telecommunication Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane controller 120 may coordinate activities within the WSON 110. Specifically, the control plane controller 120 may receive optical connection requests and provide lightpath signaling to the WSON 110 via an Interior Gateway Protocol (IGP) such as Generalized Multi-Protocol Label Switching (GMPLS), thereby coordinating the NEs 112 such that data signals are routed through the WSON 110 with little or no contention. In addition, the control plane controller 120 may communicate with the PCE 130 using PCE protocol (PCEP) to provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive the wavelength or other information that may be used for the RWA from the control plane controller 120, from the WSON 110, or both. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA information may be sent to the PCE 130 by a PCC. The PCC may be any client application requesting a path computation to be performed by the PCE 130. The PCC may also be any network component that makes such a request, such as the control plane controller 120, or any NE 112, such as a ROADM or a FOADM.

Figure 2:
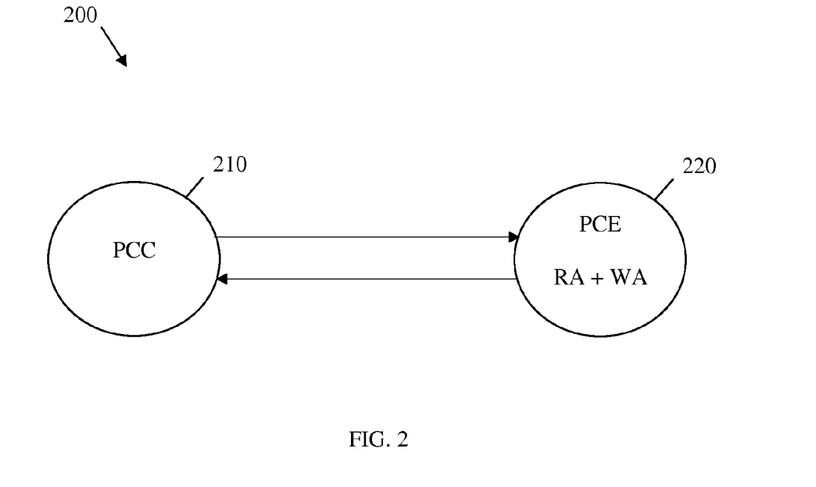
FIG. 2 is a schematic diagram of an embodiment of a combined RWA architecture.

FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information regarding the NEs and the network topology is provided. The combined RWA architecture 200 may be preferable for network optimization, smaller WSONs, or both.

Figure 3:
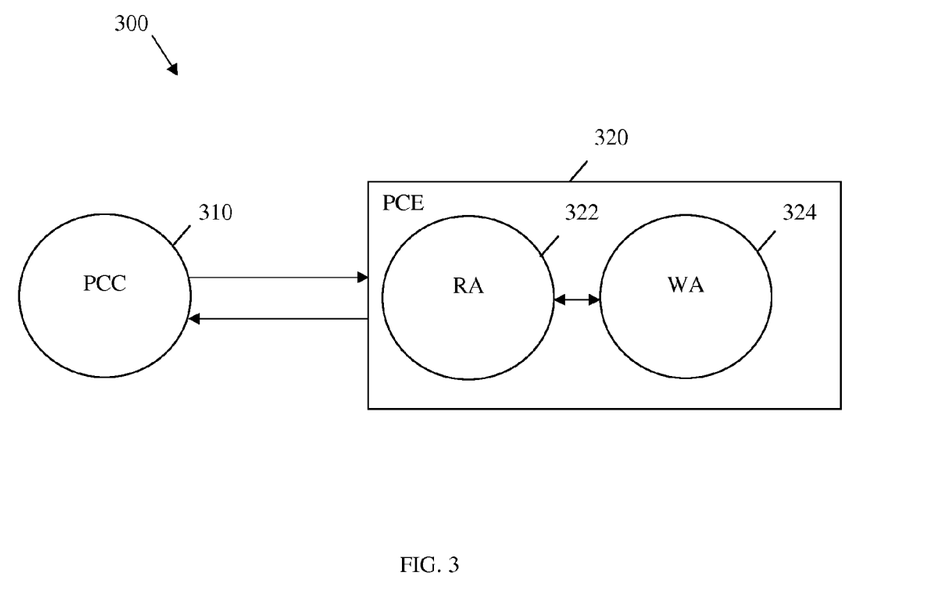
FIG. 3 is a schematic diagram of an embodiment of a separated RWA architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC 210 or 310 may receive a route from the source to destination along with the wavelengths, e.g. GMPLS labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
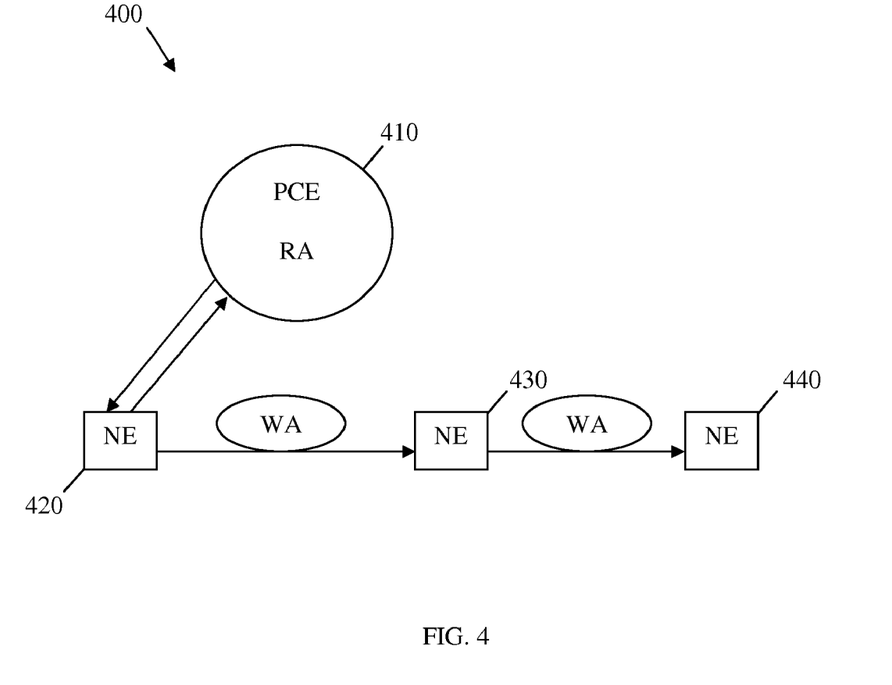
FIG. 4 is a schematic diagram of an embodiment of a distributed wavelength assignment architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
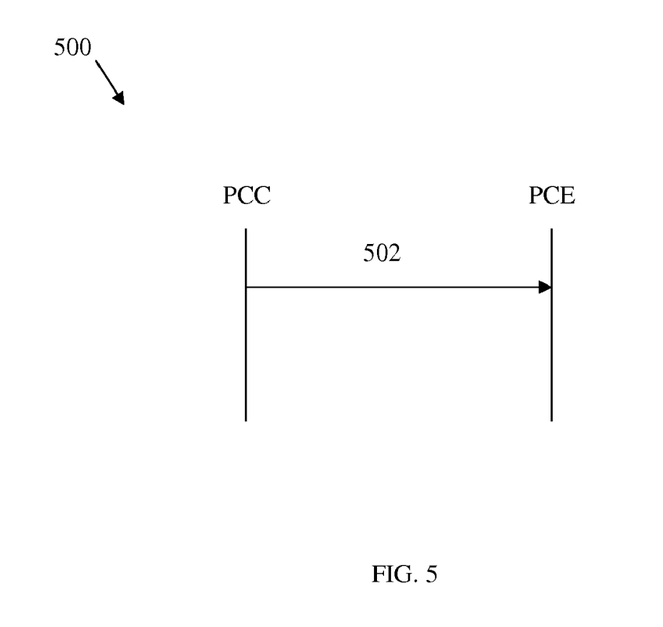
FIG. 5 is a protocol diagram of an embodiment of a PCC and PCE communication method.

FIG. 5 illustrates an embodiment of a communication method 500 between the PCC and the PCE. In the method 500, the PCC sends a message 502 to the PCE, where the message 502 comprises at least some of the RWA information described below. The message 502 may also contain a status indicator that indicates whether the RWA information is static or dynamic. In an embodiment, the status indicator may indicate how long the static or dynamic status lasts so that the PCE can know how long the RWA information is valid and/or when to expect an update. Additionally or alternatively, the message 502 may contain a type indicator that indicates whether the RWA information is associated with a node, a link, or both.

The method 500 may be implemented using any suitable protocol, such as the IGP. The IGP may be a routing protocol used for exchanging route information among gateways, such as a host computer or routers, in an autonomous network. Internet networks can be divided into multiple domains or multiple autonomous systems, where one domain congregates a batch of host computers and routers that employ the same routing protocol. In such a case, the IGP may be provided for selecting routes in a domain. The IGP may be link-state routing protocol in that each node possesses information regarding the complete network topology. In such a case, each node can independently calculate the best next hop from it for every possible destination in the network using local information of the topology. The collection of best next hops may form the routing table for the node. In a link-state protocol, the only information that may be passed between the nodes is information used to construct the connectivity maps. Examples of suitable IGPs include GMPLS, open shortest path first (OSPF), and intermediate system to intermediate system (IS-IS).

As mentioned above, the message 502 may comprise RWA information, such as at least one port restriction. The port restrictions may indicate limitations regarding the connectivity of the NE's ports, the wavelengths supported by the NE's ports, or both. Specifically, the port restrictions may comprise port connectivity information or data, port wavelength restriction information or data, and/or WC pool connectivity information or data. The WC pool connectivity information may comprise WC ingress connectivity, WC ingress wavelength constraints, WC availability or usage state, WC egress wavelength constraints, WC egress connectivity, or combinations thereof. In some embodiments, the port connectivity data, port wavelength restriction data, and/or WC pool connectivity data corresponding to a plurality of ports may be forwarded for each port individually from the PCC to the PCE. Alternatively, the port connectivity information, port wavelength restriction information, and/or WC pool connectivity information for a plurality of ports may be combined together and then forwarded to the PCE.

In an embodiment, the WC pool connectivity information may be represented by a WC pool connectivity matrix. The WC pool connectivity matrix may comprise a plurality of rows and a plurality of columns that may correspond to a plurality of pairs of WCs in a NE, e.g. between the NE ingress and egress ports. The WC pool connectivity matrix may indicate the connectivity between the ingress ports, WCs, and egress ports of the NE and the accessibility and availability of WCs. The WC pool connectivity matrix may be calculated according to a WC pool model, which may use a plurality of matrices that indicate the WC pool ingress connections, the WC pool ingress wavelength constraints, the WC pool usage state (e.g. availability), the WC pool egress wavelength constraints, and the WC pool egress connections.

Figure 6:
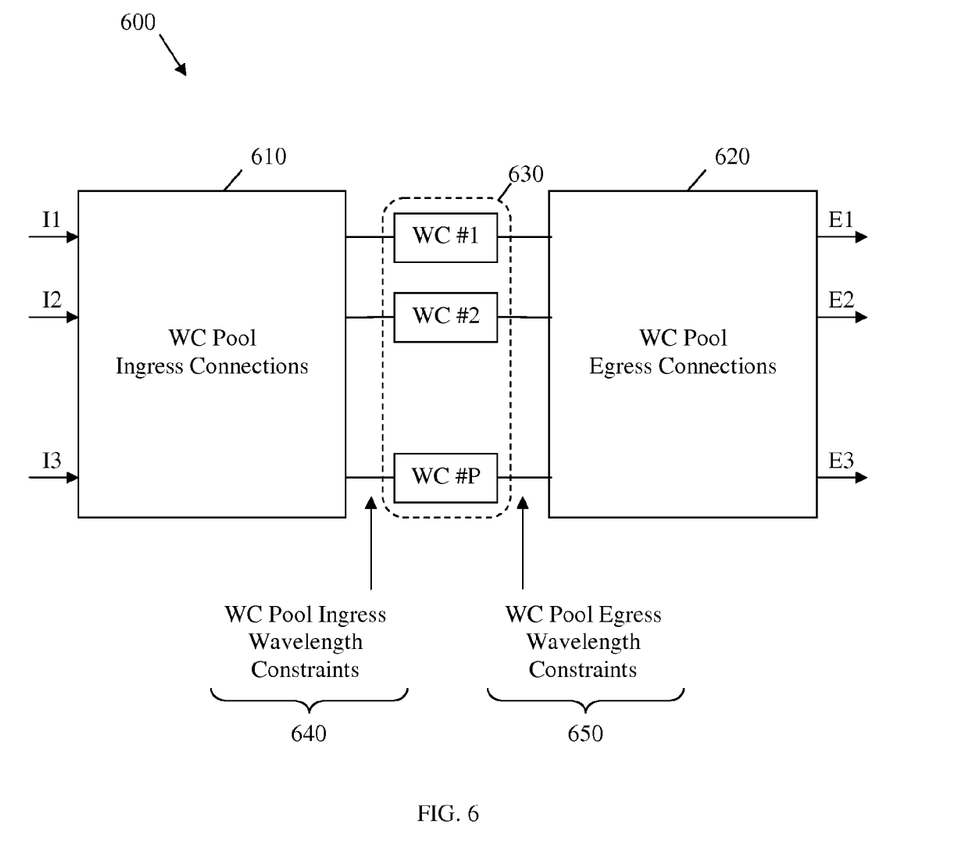
FIG. 6 is a schematic diagram of an embodiment of a wavelength converter pool model.

FIG. 6 illustrates an embodiment of a WC pool model 600, which may be used to calculate a WC pool connectivity matrix. The WC pool connectivity matrix may be communicated in the RWA information between the PCC and PCE. The WC pool model 600 may comprise information regarding WC pool ingress connections 610, WC pool egress connections 620, WC pool usage state 630, WC pool ingress wavelength constraints 640, and WC pool egress wavelength constraints 650. The different WC pool information may be represented using a plurality of corresponding matrices.

The information regarding WC pool ingress connections 610 may indicate the connections between a plurality of ingress ports (e.g. in a NE) and a plurality of WCs in the WC pool. The information regarding WC pool ingress connections 610 may be represented by a WC pool ingress connection matrix, which may comprise a plurality of rows and a plurality of columns that correspond to a plurality of pairs of ingress ports and WCs. Each ingress port and WC pair that corresponds to a row and a column in the WC pool ingress connection matrix may be set if the ingress port is connected to the WC. For example, if an ingress port is connected to a WC, a corresponding entry in the WC pool ingress connection matrix "WI" may be set as WI(i,p)=1, where i indicates the i-th ingress port, p indicates the p-th WC, and WI(i,p) is the intersection of the i-th row (or column) and the p-th column (or row) in the matrix WI. Alternatively, if the i-th ingress port is not connected to the p-th WC, the corresponding entry in the WC pool ingress connection matrix WI may be represented as WI(i,p)=0.

Similarly, the information regarding WC pool egress connections 620 may indicate the connections between a plurality of egress ports (e.g. in a NE) and the WCs in the WC pool. The information regarding WC pool egress connections 620 may be represented by a WC pool egress connection matrix, which may comprise a plurality of rows and a plurality of columns that correspond to a plurality of pairs of egress ports and WCs. Each egress port and WC pair that corresponds to a row and a column in the WC pool ingress connection matrix may be set if the egress port is connected to the WC. For example, if an egress port is connected to a WC, a corresponding entry in the WC pool egress connection matrix "WE" may be set as WE(i,p)=1, where i indicates the i-th egress port, p indicates the p-th WC, and WE(i,p) is the intersection of the i-th row (or column) and the p-th column (or row) in the matrix WE. Alternatively, if the i-th egress port is not connected to the p-th WC, the corresponding entry in the WC pool egress connection matrix WE may be represented as WE(i,p)=0.

The information regarding WC pool usage state 630 may indicate the availabilities of the individual WCs to convert the wavelengths between the ingress ports and the egress ports. For instance, each WC in the WC pool may be configured to receive a single first wavelength at an ingress port and convert it into a second wavelength, which may be transmitted at an egress port. As such, if the WC is converting a wavelength at a first ingress port, the WC's usage state may be unavailable to convert a wavelength at a second ingress port. The information regarding WC pool usage state 630 may be represented by a WC pool usage state vector, which may be a vector that comprises a plurality of rows or columns that correspond to the individual WCs. Each WC that corresponds to a row or a column in the WC pool usage state matrix or vector may be set if the WC is available, e.g. not yet assigned to convert an ingress wavelength. For example, if the WC is available, a corresponding entry in the WC pool usage state matrix or vector "WC" may be set as WC(j)=1, where j indicates the j-th WC in the WC pool and WC(j) is the j-th row or column in the vector WC. Alternatively, if the j-th WC is not available, the corresponding entry in the WC pool usage state matrix or vector WC may be represented as WC(j)=0.

The information regarding WC pool ingress wavelength constraints 640 may indicate the wavelength constraints, e.g. a set of limited wavelength(s) or wavelength range(s), for each ingress port and WC pair. The information regarding WC pool ingress wavelength constraints 640 may be represented by a WC pool ingress wavelength constraints matrix, which may comprise a plurality of rows and a plurality of columns that correspond to a plurality of ingress ports and WCs. Each ingress port and WC pair that corresponds to a row and a column in the WC pool ingress connection matrix may be assigned a value that indicates an ingress wavelength constraint. For example, the wavelength constraint value may be selected from a set of wavelength constraints values that correspond to a plurality of wavelength limits and/or ranges, e.g. a full wavelength range, a subset of the wavelength range, a subset of individual wavelengths, etc.

Similarly, the information regarding WC pool egress wavelength constraints 650 may indicate the wavelength constraints at each egress port and WC pair. The information regarding WC pool egress wavelength constraints 650 may be represented by a WC pool egress wavelength constraints matrix, which may comprise a plurality of rows and a plurality of columns that correspond to a plurality of pairs of egress ports and WCs. Each egress port and WC pair that corresponds to a row and a column in the WC pool egress connection matrix may be assigned a value that indicates an egress wavelength constraint. For example, the wavelength constraint value may be selected from a set of wavelength constraints values that correspond to a plurality of wavelength limits and/or ranges.

The WC pool connectivity matrix may be calculated as the product of the WC pool ingress connection matrix, the WC pool ingress wavelength constraints matrix, the WC pool usage state matrix or vector, the WC pool egress wavelength constraints matrix, and the WC pool egress connection matrix, in that order. For example, a WC pool connectivity matrix <ResourcePool> may be calculated as:

<ResourcePool>=<ResourceBlockInfo><PoolIngressMatrix>
   <IngressWaveConstraints>[<ResourcePool-
      State>]
   <EgressWaveConstraints><PoolEgressMatrix>, where <PoolIngressMatrix> is the WC pool ingress connection matrix, <IngressWaveConstraints> is the WC pool ingress wavelength constraints matrix, [<ResourcePool-State>] is the WC pool usage state vector, <EgressWaveConstraints> is the WC pool egress wavelength constraints matrix, and <PoolEgressMatrix> is the WC pool egress connection matrix. Additionally, <ResourceBlockInfo> may be a resource block information matrix, which may indicate resource blocks for ingress ports, WCs, and/or egress ports. The resource block information matrix may comprise a plurality of rows and a plurality of columns that correspond to a plurality of pairs of ingress ports and egress ports. In an embodiment, the resource block information matrix <ResourceBlockInfo> may be optional and the WC pool connectivity matrix <ResourcePool> may be calculated without the resource block information matrix <ResourceBlockInfo>.

The WC pool connectivity matrix may indicate the connectivity between the ingress ports, WCs, and egress ports of the NE, the availability of WCs, and the ingress and egress wavelength constraints. Specifically, the WC pool usage state vector may be used to model dynamic WC pool usage, which may have wavelength conversion capabilities based on the availability of WCs to convert wavelengths at the ingress ports. In the case of fixed WC pool usage, e.g. where each WC is assigned to a single ingress wavelength and ingress port, the WC pool usage state matrix or vector may not be needed to calculate the WC pool connectivity matrix. The WC pool information used to obtain the WC pool matrices above may be encoded and obtained using a plurality of TLVs as described in detail below.

Figure 7:
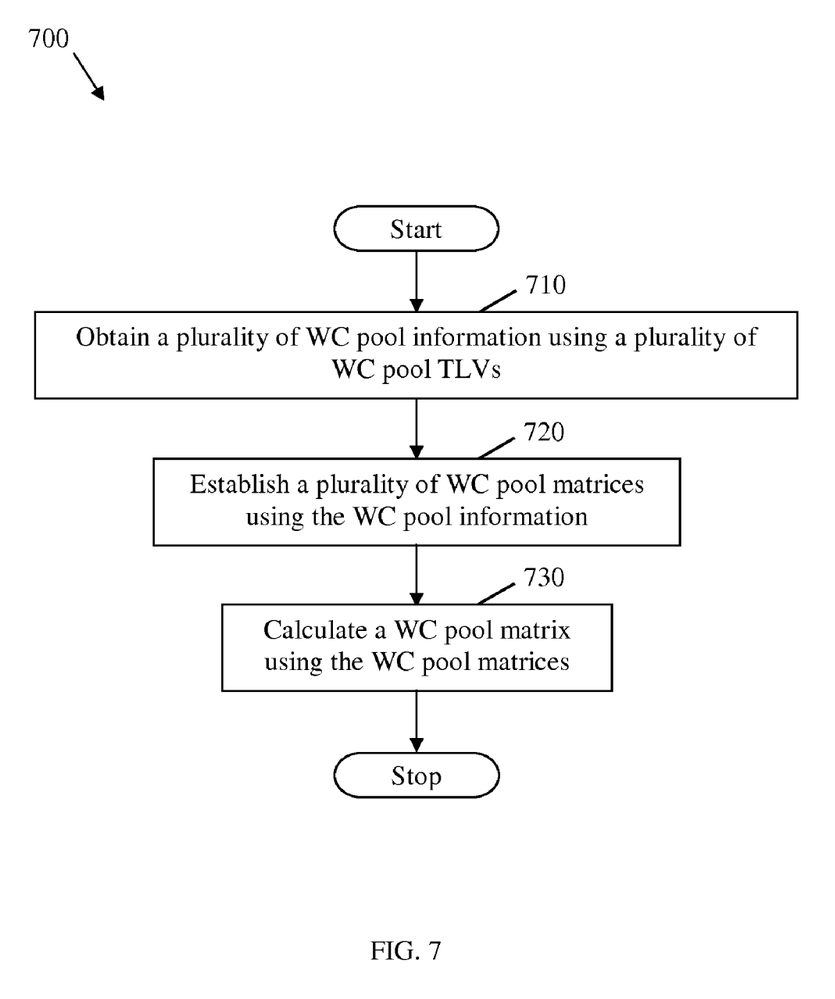
FIG. 7 is a flowchart of an embodiment of a wavelength converter pool modeling method.

FIG. 7 illustrates one embodiment of a WC pool modeling method 700, which may be used to obtain WC pool information, establish a plurality of WC pool matrices, and calculate a WC pool connectivity matrix. The WC pool modeling method may be implemented in a PCE, PCC, NE, or combinations thereof. The WC pool modeling method 700 may begin at block 710, where a plurality of encoded WC pool information may be obtained using a plurality of WC pool TLVs. The WC pool TLVs may be used to encode the WC pool information and may comprise a WC accessibility TLV, a WC range TLV, a WC usage state TLV, a WC set field, or combinations thereof. The WC pool TLVs may be combined in at least one message or TLV or may be sent using individual messages or TLVs. For example, a NE or PCC may send the WC pool information using at least one TLV to the PCC.

At block 720, a plurality of WC pool matrices may be established using the WC pool information. The WC pool matrices may comprise a WC pool ingress connection matrix, a WC pool ingress wavelength constraints matrix, a WC pool usage state matrix or vector, a WC pool egress wavelength constraints matrix, a WC pool egress connection matrix, or combinations thereof. For instance, the WC pool ingress connection matrix and the WC pool egress connection matrix may be established based on the WC accessibility TLV, the WC pool ingress wavelength constraints matrix and the WC pool egress wavelength constraints matrix may be established based on the WC range TLV, and the WC pool usage state vector may be established based on the WC usage state TLV. Additionally, the WC pool matrices may be established using information in the WC set field in any of the WC pool TLVs. At block 730, a WC pool matrix may be calculated using the WC pool matrices. For example, the PCE and/or PCC may calculate the WC pool matrix based on equation one to model current WC pool usage. Similarly, the WC pool matrix may be updated using the WC pool TLVs and the WC pool matrices, e.g. in a periodic manner or upon demand. The method 700 may then end.

Figure 8:
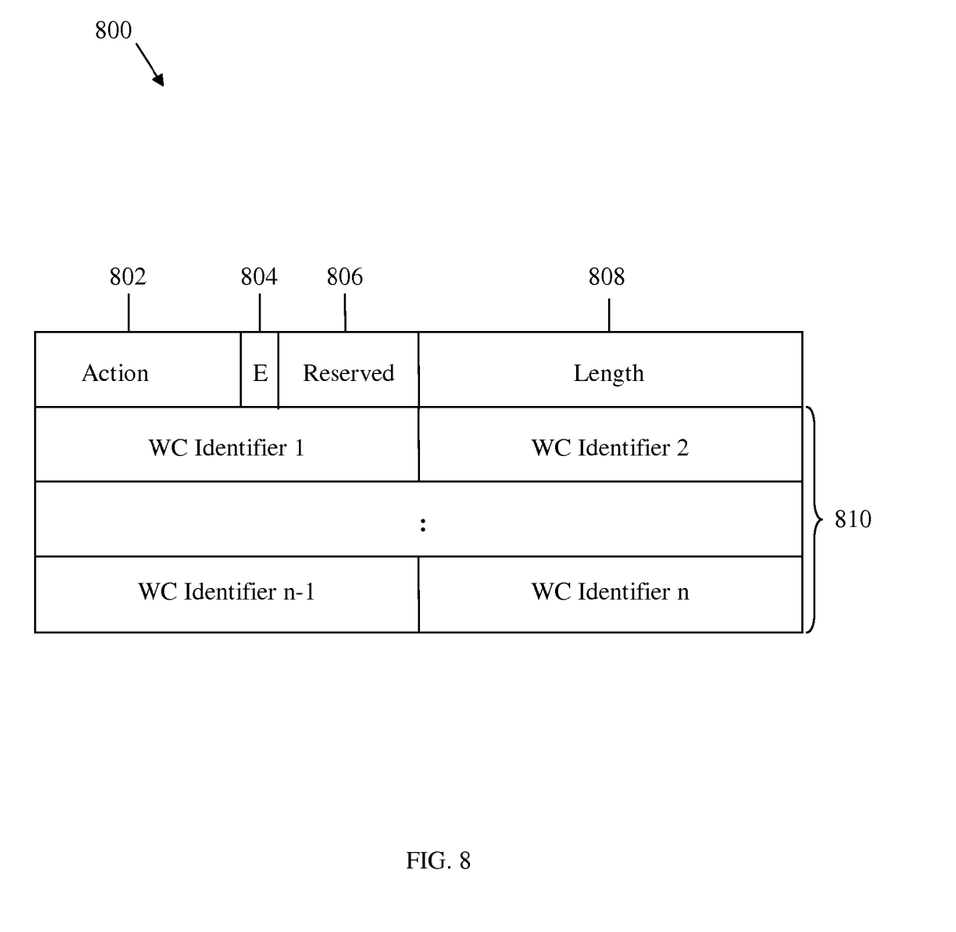
FIG. 8 is a schematic diagram of an embodiment of a wavelength converter set field.

FIG. 8 illustrates an embodiment of a WC set field 800, which may be used to exchange WC pool information, e.g. between the PCC and PCE, and calculate a WC pool connectivity matrix, e.g. based on the WC pool model 600. Specifically, the WC set field 800 may be used to describe a WC pool and its properties and may be configured similar to a label set, e.g. according to the Internet Engineering Task Force (IETF) Request for Comments (RFC) 4861, which is incorporated herein by reference as if reproduced in its entirety. For instance, the WC set field 800 may be included in a TLV, such as a WC accessibility TLV, a WC range TLV, a WC usage state TLV, which may be sent from a PCC to a PCE. The WC set field 800 may comprise an Action field 802, a one bit (E) flag 804, a Reserved field 806, a Length field 808, and at least one WC Identifier 810. The WC set field 800 may not comprise a padding field, e.g. subsequent to the last WC Identifier 810. In an embodiment, the Action field 802 may have a size equal to about eight bits, the E flag 804 may have a size equal to about one bit, the Reserved field 806 may have a size equal to about seven bits, and each one of the Length field 808 and the WC Identifier 810 may have a size equal to about 16 bits.

The Action field 802 may be set to about zero to indicate that the WC set field 800 comprises a discrete set of at least one WC Identifier 810 that specifies a WC in the WC pool. Alternatively, the Action field 802 may be set to about two to indicate that the WC set field 800 comprises a range or list of WC Identifiers 810 that specify a plurality of WCs in the WC pool. Specifically, the WC set field 800 may comprise a first WC Identifier 810 that specifies a first WC in the range and a second WC Identifier 810 that specifies the last WC in the range. Using about two WC Identifiers 810 in the WC set field 800 to specify a range of WCs instead of an individual WC Identifier 810 for each WC may substantially reduce the amount of information exchanged in the system. The E flag 804 may be set, e.g. to about zero, to indicate that the WC set field 800 comprises an odd number of WC Identifiers 810. Alternatively, the E flag 804 may be set, e.g. to about one, to indicate that the WC set field 800 comprises an even number of WC Identifiers 810. The Reserved field 806 may not be used and ignored or may be reserved for other purposes. For example, the Reserved field 806 may be set to about zero. The Length field 808 may indicate the size of the WC set field 800, e.g. in bytes. The WC Identifier 810 may specify one of the WCs in the WC pool. For example, The WC Identifier 810 may comprise an identifier (ID) value uniquely associated with one of the WCs.

Figure 9:
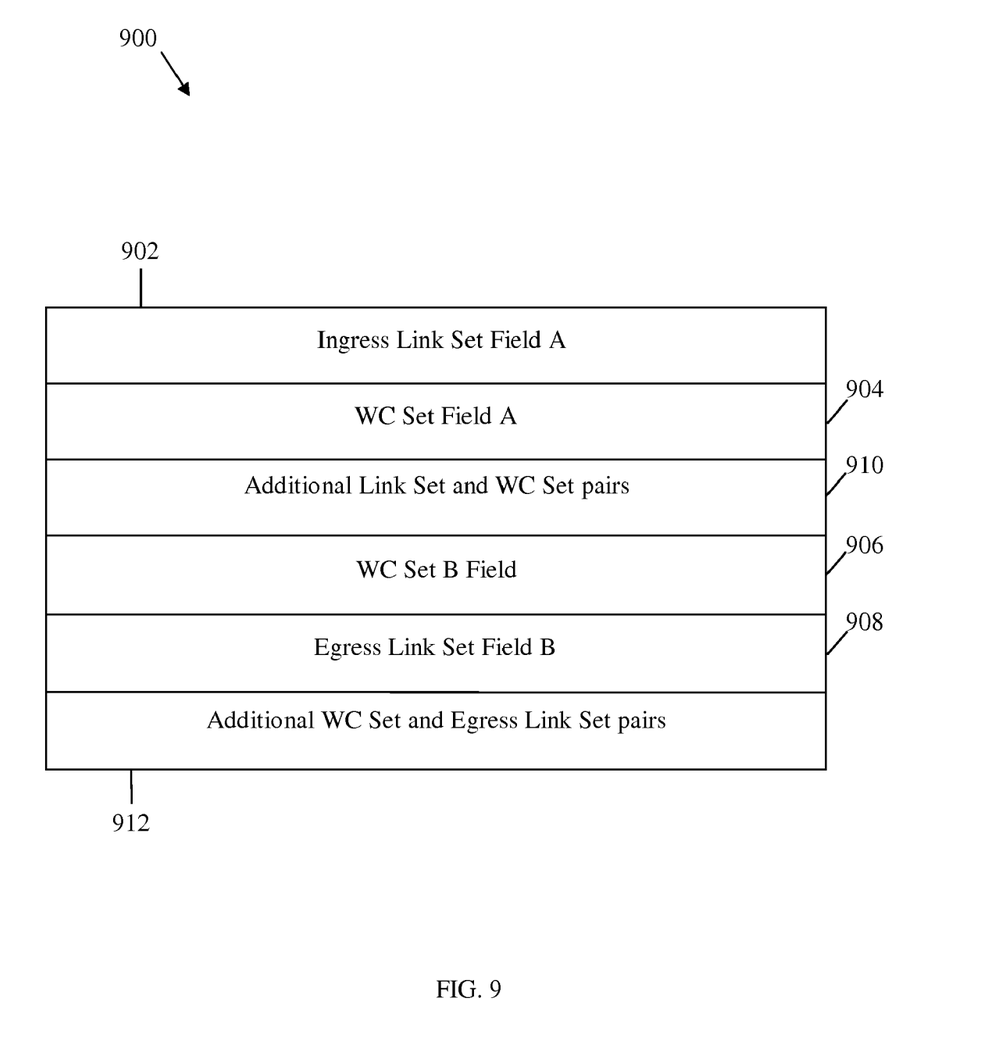
FIG. 9 is a schematic diagram of an embodiment of a wavelength converter accessibility Type-Length-Value.

FIG. 9 illustrates an embodiment of a WC accessibility TLV 900, which may be used to exchange WC pool information and calculate a WC pool connectivity matrix. Specifically, the WC accessibility TLV 900 may be used to describe a structure of the WC pool, such as the ability of an ingress port to reach a WC and/or the ability of the WC to reach an egress port. Such information may be used to obtain the WC pool ingress connection matrix and/or the WC pool egress connection matrix. The WC accessibility TLV 900 may comprise an Ingress Link Set field A 902, a first WC Set field A 904, a second WC Set field B 906, and an Egress Link Set field B 908. In an embodiment, the WC accessibility TLV 900 may also comprise at least one additional Ingress Link Set field and WC Set field pair 910, at least one additional WC Set field and Egress Link Set field pair 912, or both, e.g. as needed to obtain the WC pool ingress connection matrix and/or the WC pool egress connection matrix. Each of the set fields in the WC accessibility TLV 900 may be configured similar to the WC Set field 800.

For instance, the Ingress Link Set field A 902 may comprise at least one Ingress Link Identifier, which may be configured similar to the WC Identifier 810 but may specify an ingress port link with a WC. The WC Set field A 904 may comprise at least one WC Identifier (e.g. WC Identifier 810) that specifies a WC linked to an ingress port specified in the Ingress Link Set field A 902. Additionally, the Egress Link Set field B 908 may comprise at least one Egress Link Identifier, which may specify an egress port link with a WC, and the WC Set field B 906 may comprise at least one WC Identifier that specifies a WC linked to an egress port specified in the Egress Link Set field B 908. Similarly, each additional Ingress Link Set field and WC Set field pair 910 may comprise at least one Ingress Link Identifier and at least one WC Identifier, and each WC Set field and Egress Link Set field pair 912 may comprise at least one WC Identifier and at least one Egress Link Identifier. In an embodiment, each link set field, e.g. the Ingress Link Set field A 902 or the Egress Link Set field B 908, may also comprise a direction parameter which may be set to indicate whether the link set field corresponds to an ingress link set or an egress link set. The direction parameter may not comprise a bi-directional value, e.g. that indicates both an ingress link and egress link.

Figure 10:
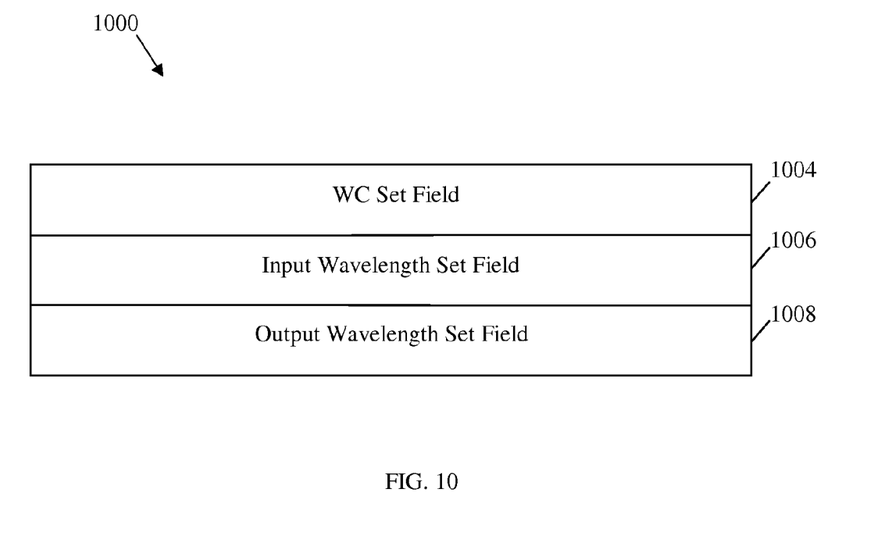
FIG. 10 is a schematic diagram of an embodiment of a wavelength conversion range Type-Length-Value.

FIG. 10 illustrates an embodiment of a WC range TLV 1000, which may be used to exchange WC pool information and calculate a WC pool connectivity matrix. Specifically, the WC range TLV 1000 may be used to specify a limited input range and output range for a WC pool, e.g. at the NE. For example, due to the structure of the optical system, a limited range of wavelengths may reach or leave the WC(s), e.g. in the NE. Such information may be used to obtain the WC pool ingress wavelength constraints matrix and/or the WC pool egress wavelength constraints matrix. The WC range TLV 1000 may comprise a WC Set field 1004, an Input Wavelength Set field 1006, and an Output Wavelength Set field 1008, which may be configured similar to the WC Set field 800.

For instance, the WC Set field 1004 may comprise at least one WC Identifier (e.g. WC Identifier 810) that specifies a WC in the WC pool that has an input wavelength range indicated by the Input Wavelength Set field 1006 and an output wavelength range indicated by the Output Wavelength Set field 1008. The Input Wavelength Set field 1006 may comprise at least one Input Wavelength Identifier, which may be configured similar to the WC Identifier 810 but may specify an input wavelength to the WC(s) indicated in the WC Set field 1004. Similarly, the Output Wavelength Set field 1008 may comprise at least one Output Wavelength Identifier that specifies an output wavelength from the WC(s) indicated in the WC Set field 1004.

Figure 11:
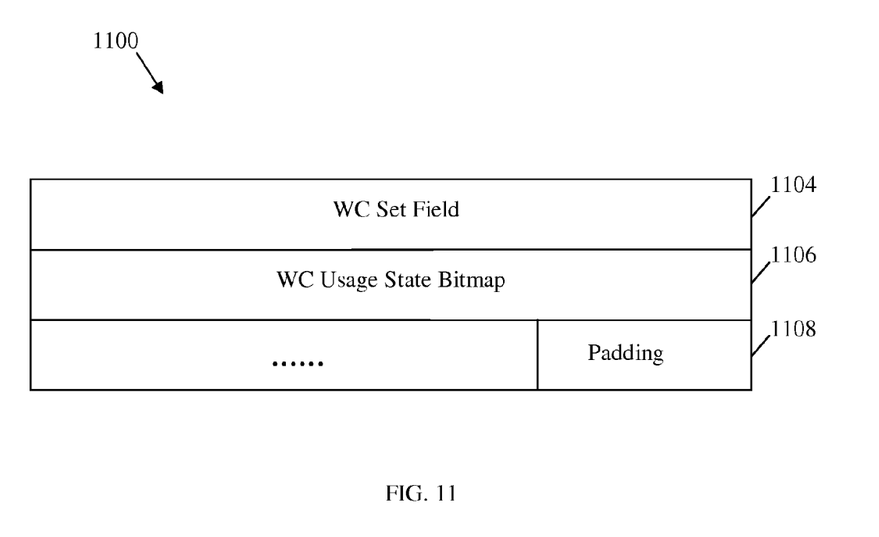
FIG. 11 is a schematic diagram of an embodiment of a wavelength converter usage state Type-Length-Value.

FIG. 11 illustrates an embodiment of a WC usage state TLV 1100, which may be used to exchange WC pool information and calculate a WC pool connectivity matrix. Specifically, the WC range TLV 1100 may be used to indicate which WC(s) in the WC may be available for use. The WC usage state information may be dynamic, e.g. may change over time, e.g. when some of the WCs may switch from idle to active when a connection is established and/or other WCs may switch from active to idle when a connection is terminated. Such information may be used to obtain the WC pool usage state matrix. The WC usage state TLV 1100 may comprise a WC Set field 1104, a WC Usage State Bitmap 1106, and optionally a Padding 1108.

The WC Set field 1104 may be configured similar to the WC Set field 800 and may comprise at least one WC Identifier (e.g. WC Identifier 810) that specifies a WC in the WC pool. The WC Usage State Bitmap 1106 may have a variable size, which may be a multiple of about four bytes, and may comprise a plurality of bits that correspond to a plurality of WCs in the WC pool. Each bit may be set to about zero (or about one) to indicate that the corresponding WC is available, or to about one (or about zero) to indicate that the corresponding WC is used. The sequence of the bits in the WC Usage State Bitmap 1106 may be ordered according to the sequence of the WC Identifiers in the WC Set field 1104. The Padding 1108 may have a variable size and may comprise a plurality of bits that may be set to about zero.

Figure 12:
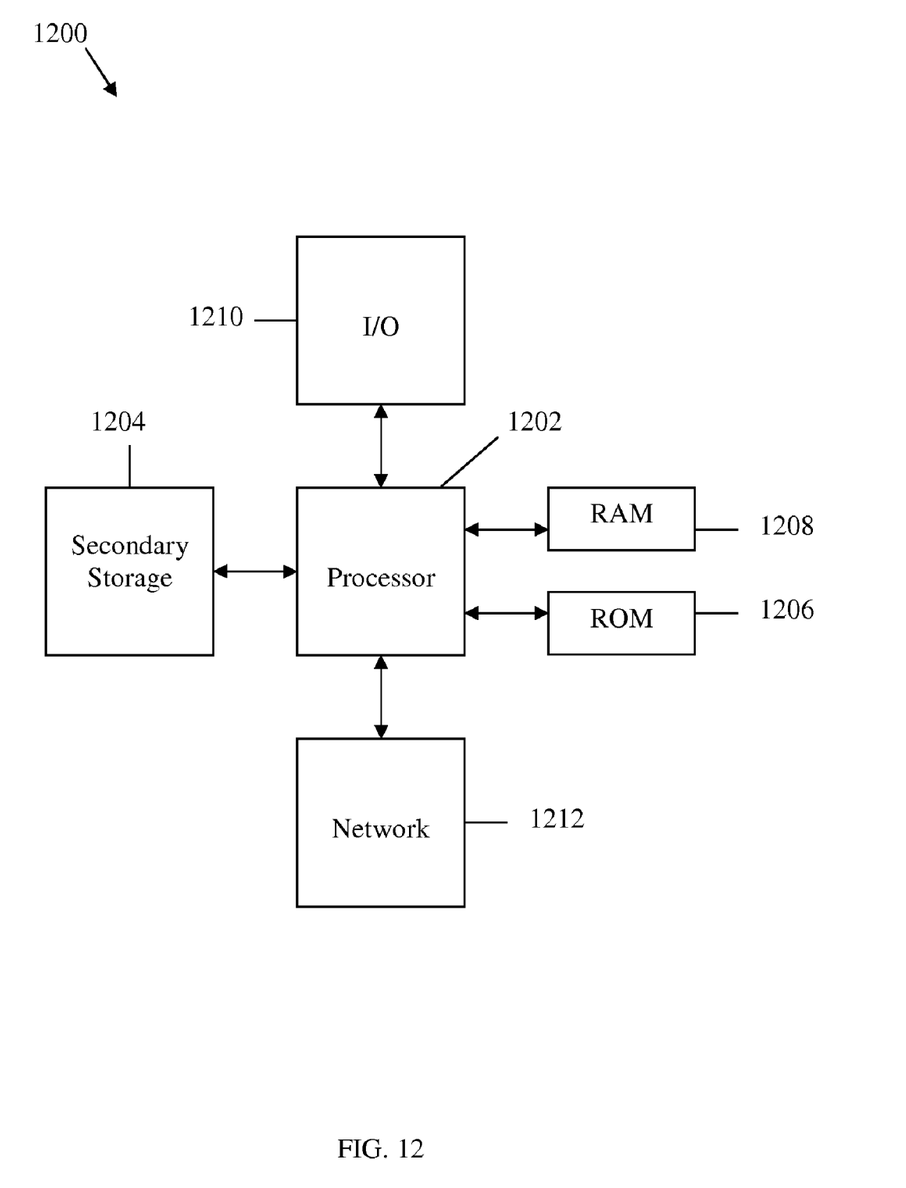
FIG. 12 is a schematic diagram of an embodiment of a general-purpose of computer system.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a path computation element (PCE) configured to:
   communicate with a node comprising a plurality of wavelength converters (WCs); and
   compute a lightpath that passes through the node using a WC pool information based on a dynamic WC pool model,
   wherein the dynamic WC pool model comprises information regarding WC pool usage state represented using a WC pool usage state vector,
   wherein the information regarding WC pool usage state is communicated to the PCE using a WC usage state Type-Length-Value (TLV) that indicates whether each of the WCs is reserved for wavelength conversion or idle at a specified time, and
   wherein the WC usage state TLV comprises a WC set field that specifies at least one WC and a WC usage state bitmap that indicates whether each WC in the WC set field is available for wavelength conversion.

2. The apparatus of claim 1, wherein the dynamic WC pool model further comprises information regarding WC pool ingress connections represented using a WC pool ingress connection matrix, WC pool egress connections represented using a WC pool egress connection matrix, WC pool ingress wavelength constraints represented using a WC pool ingress wavelength constraints matrix, WC pool egress wavelength constraints represented using a WC pool egress wavelength constraints matrix, or combinations thereof.

3. The apparatus of claim 2, wherein the information regarding WC pool ingress connections, the WC pool egress connections, or both are communicated to the PCE using a WC accessibility TLV.

4. The apparatus of claim 3, wherein the WC accessibility TLV comprises an ingress link set field that specifies an ingress link with a first WC in the WC pool, a first WC set field that specifies the first WC corresponding to the ingress link, an egress link set field that specifies an egress link with the first WC or a second WC in the WC pool, and a second WC set field that specifies the first WC or a second WC corresponding to the egress link.

5. The apparatus of claim 2, wherein the information regarding WC pool ingress wavelength constraints, WC pool egress wavelength constraints, or both are communicated to the PCE using a WC range TLV.

6. The apparatus of claim 5, wherein the WC range TLV comprises a WC set field that specifies at least one WC, an input wavelength set field that specifies an input wavelength for each WC in the WC set field, and an output wavelength set field that specifies an output wavelength for each WC.

7. The apparatus of claim 2, wherein the information regarding WC pool usage state, WC pool ingress connections, WC pool egress connections, WC pool ingress wavelength constraints, WC pool egress wavelength constraints, or combinations thereof is exchanged between a path computation client (PCC) associated with the WC pool and the PCE, and wherein the PCE is not located on the lightpath.

8. A network component comprising a path computation element (PCE) configured to:
   receive a wavelength converter (WC) range Type-Length-Value (TLV) from a node that comprises a plurality of ingress ports connected to a plurality of WCs, wherein the WC range TLV comprises a WC set field that specifies at least one WC and an input wavelength set field that indicates a wavelength that can be accepted via an ingress port connection for each WC in the WC set field;
   receive a wavelength converter (WC) usage state Type-Length-Value (TLV) from the node, wherein the TLV comprises information regarding WC pool usage state;
   establish a WC pool usage state vector for the node using the information in the WC usage state TLV;
   establish a WC pool usage state vector for the node using the information in the WC usage state TLV; and
   calculate a WC pool connectivity matrix for the node based on the WC range TLV data and the WC usage state vector.

9. The network component of claim 8, wherein the PCE is further configured to: receive information regarding WC pool ingress connections and WC pool egress connections from the node; establish a WC pool ingress connection matrix and a WC pool egress connection matrix for the node using the information regarding WC pool ingress connections and WC pool egress connections; and calculate the WC pool connectivity matrix for the node based on the WC pool ingress connection matrix and a WC pool egress connection matrix.

10. The network component of claim 8, wherein the information regarding WC pool ingress connections and WC pool egress connections is received in a WC accessibility TLV.

11. The network component of claim 8, wherein the node comprises a plurality of egress ports connected to the plurality of WCs, wherein the WC range TLV comprises an output wavelength set field that indicates a wavelength that can be transmitted via an egress port connection for each WC in the WC set field, and wherein calculating a WC pool connectivity matrix based on the WC range TLV data and the WC usage state vector comprises:

establishing a WC pool ingress wavelength constraints matrix and a WC pool egress wavelength constraints matrix for the node using the WC range TLV information; and calculating the WC pool connectivity matrix for the node based on the WC pool ingress wavelength constraints matrix and the WC pool egress wavelength constraints matrix.

12. The network component of claim 8, wherein the WC pool connectivity matrix is calculated by:
<ResourcePool>=<ResourceBlockInfo>
<PoolIngressMatrix><IngressWaveConstraints>[<ResourcePoolState>]
<EgressWaveConstraints><PoolEgressMatrix>, where <ResourcePool> is the WC pool connectivity matrix, [<ResourcePoolState>] is the WC pool usage state vector, <PoolIngressMatrix> is the WC pool ingress connection matrix, <IngressWaveConstraints> is a WC pool ingress wavelength constraints matrix, <EgressWaveConstraints> is a WC pool egress wavelength constraints matrix, <PoolEgressMatrix> is a WC pool egress connection matrix, and <ResourceBlockInfo> is an resource block information matrix.

13. The network component of claim 8, wherein the PCE is further configured to use the WC pool connectivity matrix to calculate a lightpath in a wavelength switched optical network (WSON), and wherein the PCE is not located on the lightpath.

14. A method comprising: receiving, by a path computation element (PCE) positioned in a first node, a wavelength converter (WC) accessibility Type-Length-Value (TLV) from a second node that comprises a plurality of WCs, a plurality of ingress ports coupled to the WCs, and a plurality of egress ports coupled to the WCs, and wherein the WC accessibility TLV comprises: a WC set field that specifies at least one WC and an ingress link set field that indicates an ingress port that is coupled to each WC in the WC set field; and a second WC set field that specifies at least one WC and an egress link set field that indicates an egress port that is coupled to each WC in the second WC set field; calculating, by the PCE, a WC pool ingress connection matrix for the second node from the information in the WC accessibility TLV; calculating, by the PCE, a WC pool egress connection matrix for the second node from the information in the WC accessibility TLV; calculating, by the PCE, a WC pool usage state vector using a WC usage state bitmap from the second node, wherein the WC usage state bitmap indicates a usage state for the WCs in the second node; and calculating, by the PCE, a WC pool connectivity matrix for the second node based on the WC usage state vector, the WC pool ingress connection matrix, and the WC pool egress connection matrix.

15. The method of claim 14, wherein the WC pool connectivity matrix is calculated based on a WC pool ingress wavelength constraints matrix, a WC pool egress wavelength constraints matrix, or both.

16. The method of claim 14, wherein the WC pool connectivity matrix is modified when a first WC in a WC pool switches from idle to active, the first WC or a second WC in the WC pool switches from active to idle, or both.

17. The method of claim 14, wherein the WC pool usage state vector, the WC pool connectivity matrix, or both are transmitted to a path computation element (PCE), wherein the PCE is configured to use the WC pool usage state vector, the WC pool connectivity matrix, or both to calculate a lightpath in a wavelength switched optical network (WSON), and wherein the PCE is not located on the lightpath.

18. The apparatus of claim 2, wherein the WC usage state TLV comprises a WC set field that specifies at least one WC and a WC usage state bitmap that indicates whether each WC in the WC set field is used.

* * * * *

UNITED STATES PATENT AND TRADEMARK OFFICE
CERTIFICATE OF CORRECTION

PATENT NO. : 8,385,739 B2  
APPLICATION NO. : 12/711386  
DATED : February 26, 2013  
INVENTOR(S) : Young Lee, Greg Bernstein and Jianrui Han Page 1 of 1

It is certified that error appears in the above-identified patent and that said Letters Patent is hereby corrected as shown below:

In the Claims:

Column 14 Line 44 - Claim 8 should read as follows:

8. A network component comprising a path computation element (PCE) configured to:
receive a wavelength converter (WC) range Type-Length-Value (TLV) from a node that comprises a plurality of ingress ports connected to a plurality of WCs, wherein the WC range TLV comprises a WC set field that specifies at least one WC and an input wavelength set field that indicates a wavelength that can be accepted via an ingress port connection for each WC in the WC set field;
receive a wavelength converter (WC) usage state Type-Length-Value (TLV) from the node, wherein the TLV comprises information regarding WC pool usage state;
establish a WC pool usage state vector for the node using the information in the WC usage state TLV; and
calculate a WC pool connectivity matrix for the node based on the WC range TLV data and the WC usage state vector.

Signed and Sealed this  
Fourth Day of June, 2013

Teresa Stanek Rea  
*Acting Director of the United States Patent and Trademark Office*